United States Patent
Hung et al.

(10) Patent No.: US 10,055,636 B2
(45) Date of Patent: Aug. 21, 2018

(54) LIGHT HOMOGENIZING DEVICE AND BIOMETRIC IDENTIFYING DEVICE

(71) Applicant: GINGY TECHNOLOGY INC., Hsinchu (TW)

(72) Inventors: Chun-Lang Hung, Hsinchu (TW); Chien-Hsing Wu, Hsinchu (TW)

(73) Assignee: GINGY TECHNOLOGY INC., Hsinchu (TW)

( * ) Notice: Subject to any disclaimer, the term of this patent is extended or adjusted under 35 U.S.C. 154(b) by 39 days.

(21) Appl. No.: 15/468,130

(22) Filed: Mar. 24, 2017

(65) Prior Publication Data

US 2018/0204038 A1 Jul. 19, 2018

(30) Foreign Application Priority Data

Jan. 17, 2017 (CN) .................. 2017 2 0048773 U

(51) Int. Cl.
*G06K 9/00* (2006.01)
*G02B 5/02* (2006.01)

(52) U.S. Cl.
CPC ......... *G06K 9/0004* (2013.01); *G02B 5/0205* (2013.01); *G02B 5/0278* (2013.01); *G06K 9/00087* (2013.01)

(58) Field of Classification Search
CPC ........... G06K 9/00046; G06K 9/00013; G06K 9/0012; G06K 9/209; A61B 5/1172
See application file for complete search history.

(56) References Cited

U.S. PATENT DOCUMENTS

| | | | | |
|---|---|---|---|---|
| 4,924,085 A * | 5/1990 | Kato | .................... | A61B 5/1172 250/227.28 |
| 6,157,735 A * | 12/2000 | Holub | .................... | G01J 3/50 348/E17.004 |
| 8,811,689 B2 * | 8/2014 | Kiyomizu | .......... | G06K 9/00013 382/115 |
| 2003/0063783 A1 * | 4/2003 | Higuchi | ............ | G06K 9/00046 382/125 |
| 2004/0252867 A1 * | 12/2004 | Lan | ...................... | G06K 9/0004 382/124 |
| 2008/0137920 A1 * | 6/2008 | Miura | ................ | G06K 9/00013 382/124 |
| 2008/0230681 A1 * | 9/2008 | Yoshizu | ............ | G06K 9/00033 250/208.1 |
| 2008/0317293 A1 * | 12/2008 | Sakurai | ............. | G06K 9/00013 382/115 |

(Continued)

*Primary Examiner* — Bhavesh Mehta
*Assistant Examiner* — Ian Lemieux
(74) *Attorney, Agent, or Firm* — CKC & Partners Co., Ltd.

(57) ABSTRACT

The present disclosure provides a light homogenizing device and a biometric identifying device. The light homogenizing device includes a light homogenizing member and light-emitting units. The light homogenizing member includes a hole and protrusion structures. The protrusion structures are disposed on a first surface of the light homogenizing member and surrounding an outside of the hole. A circular inclined-plane is disposed between the hole and the protrusion structures and connected to the hole. The light-emitting units are disposed opposite to the first surface, and each light-emitting units transmits a light to one of the protrusion structures. The protrusion structures homogenize the light and outwardly transmit the homogenized light through a second surface of the light homogenizing member.

13 Claims, 5 Drawing Sheets

(56) References Cited

U.S. PATENT DOCUMENTS

| | | | |
|---|---|---|---|
| 2010/0111361 A1* | 5/2010 | Tan | G06K 7/10732 382/103 |
| 2012/0050721 A1* | 3/2012 | Nagasaka | G06K 9/00013 356/71 |
| 2013/0070074 A1* | 3/2013 | Won | G01L 1/247 348/77 |
| 2013/0135513 A1* | 5/2013 | Choi | A61B 5/0077 348/335 |
| 2016/0034772 A1* | 2/2016 | Betensky | G06K 9/0004 382/124 |

* cited by examiner

LIGHT HOMOGENIZING DEVICE AND BIOMETRIC IDENTIFYING DEVICE

RELATED APPLICATIONS

This application claims priority to China Application Serial Number 201720048773.6, filed Jan. 17, 2017, which is herein incorporated by reference.

BACKGROUND

Technical Field

The present disclosure relates to a light homogenizing device and a biometric identifying device. More particularly, the present disclosure relates to a biometric identifying device and a light homogenizing device having a light homogenizing member disposed with protrusion structures and a circular inclined-plane.

Description of Related Art

Along with the development of technology and the progress of times, more and more electronic devices are disposed with a fingerprint reader for the use to perform operations such as unlocking the device. Typically when the user touches the fingerprint reader with, for example, a finger, the light-emitting unit in the fingerprint reader may emit a light for irradiating the finger of the user. Next, the imaging unit in the fingerprint reader may capture the light reflected by the finger for elements such as a processor to perform subsequent fingerprint identification.

Light homogenizing devices are commonly disposed in the fingerprint reader to homogenize the light irradiating the finger of the user to promote the performance of fingerprint identification. However, a conventional light homogenizing device is merely a sheet that transmits lights, and the light-homogenizing performance thereof is unsatisfying. Therefore, to a person having ordinary skills in the art, it is crucial to design a light homogenizing device capable of providing better light-homogenizing performances.

SUMMARY

The present disclosure provides a light homogenizing device including a light homogenizing member and a plurality of light-emitting units. The light homogenizing member has a hole and a plurality of protrusion structures. The protrusion structures are disposed on a first surface of the light homogenizing member and surrounding outside of the hole. A circular inclined-plane is disposed between the hole and the protrusion structures, and the circular inclined-plane is connected to the hole. The light-emitting units are disposed opposite to the first surface. Each of the light-emitting units emits a light to one of the protrusion structures. The protrusion structures homogenizes the light and outwardly transmits the homogenized light through a second surface of the light homogenizing member.

The present disclosure provides a biometric identifying device including a press sheet, a light homogenizing device, and an imaging unit. The press sheet is configured to contact with an organism. The light homogenizing device includes a light homogenizing member and a plurality of light-emitting units. The light homogenizing member has a hole and a plurality of protrusion structures. The protrusion structures are disposed on a first surface of the light homogenizing member and surrounding outside of the hole. A circular inclined-plane is disposed between the hole and the protrusion structures, and the circular inclined-plane is connected to the hole. The light-emitting units are disposed opposite to the first surface. Each of the light-emitting units emits a light to one of the protrusion structures. The protrusion structures homogenizes the light and outwardly transmits the homogenized light through a second surface of the light homogenizing member to irradiate the organism through the press sheet. The imaging unit identifies a biometric of the organism based on the light reflected by the organism.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
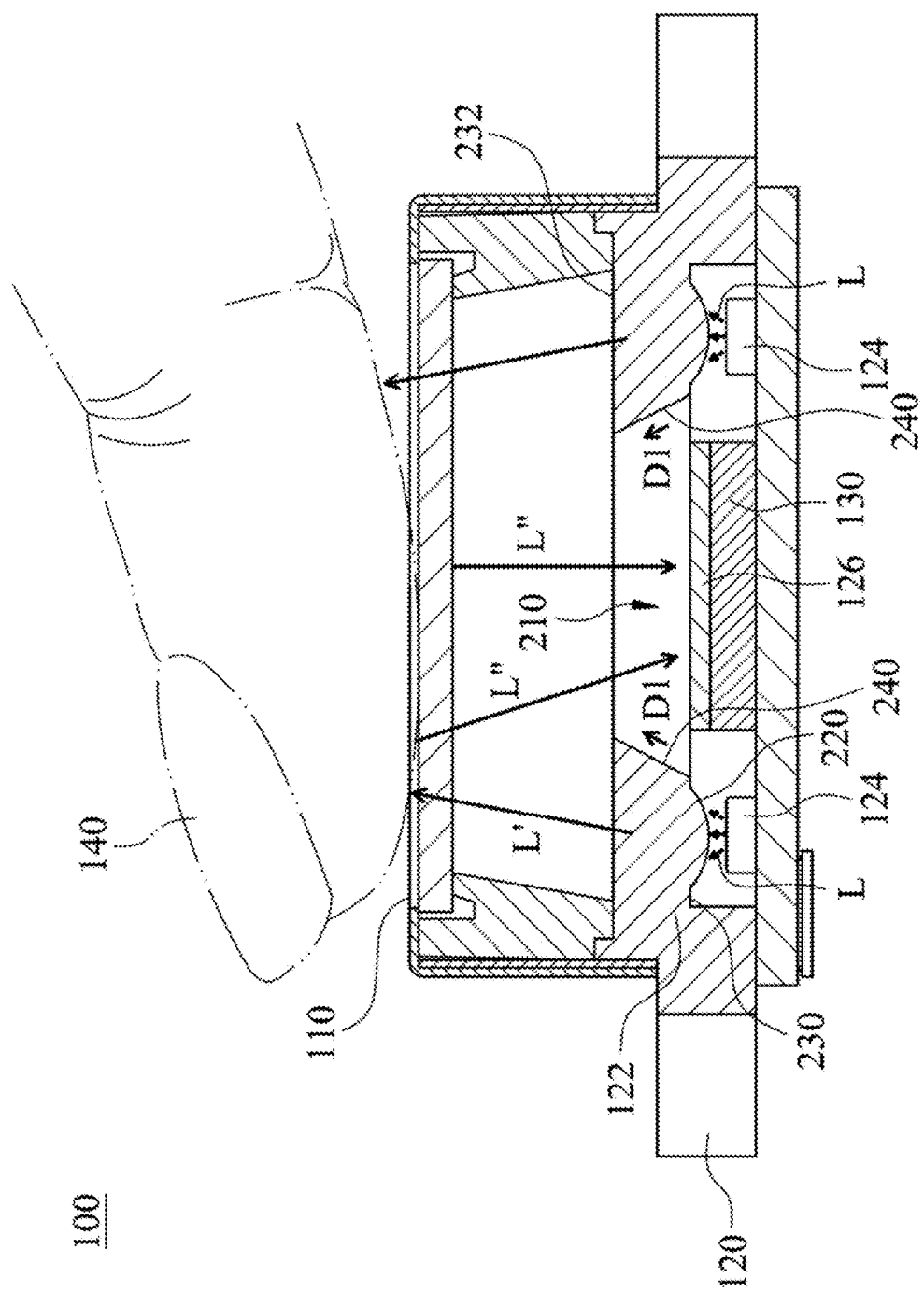
FIG. 1 illustrates a cross-sectional view of a biometric identifying device according to an embodiment of the present disclosure;.
Figure 2A:
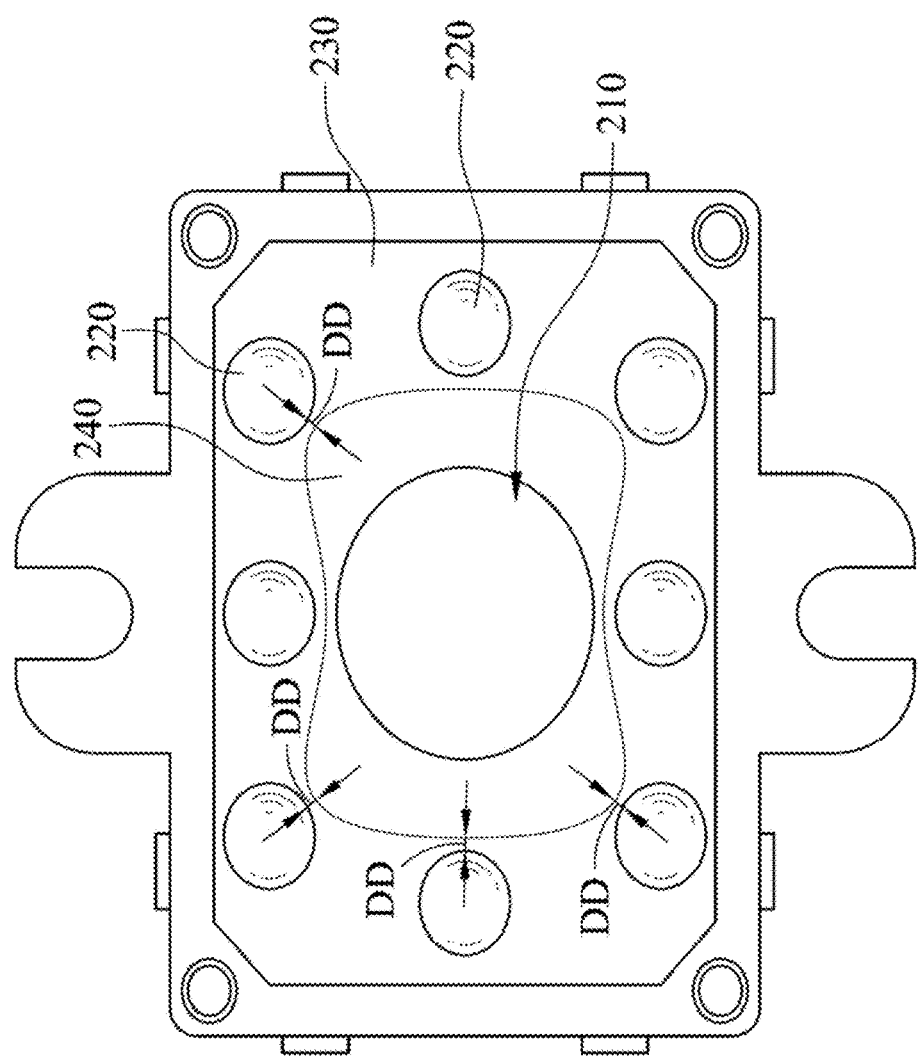
FIG. 2A illustrates a bottom view of a light homogenizing member according to the embodiment of FIG. 1.
Figure 2B:
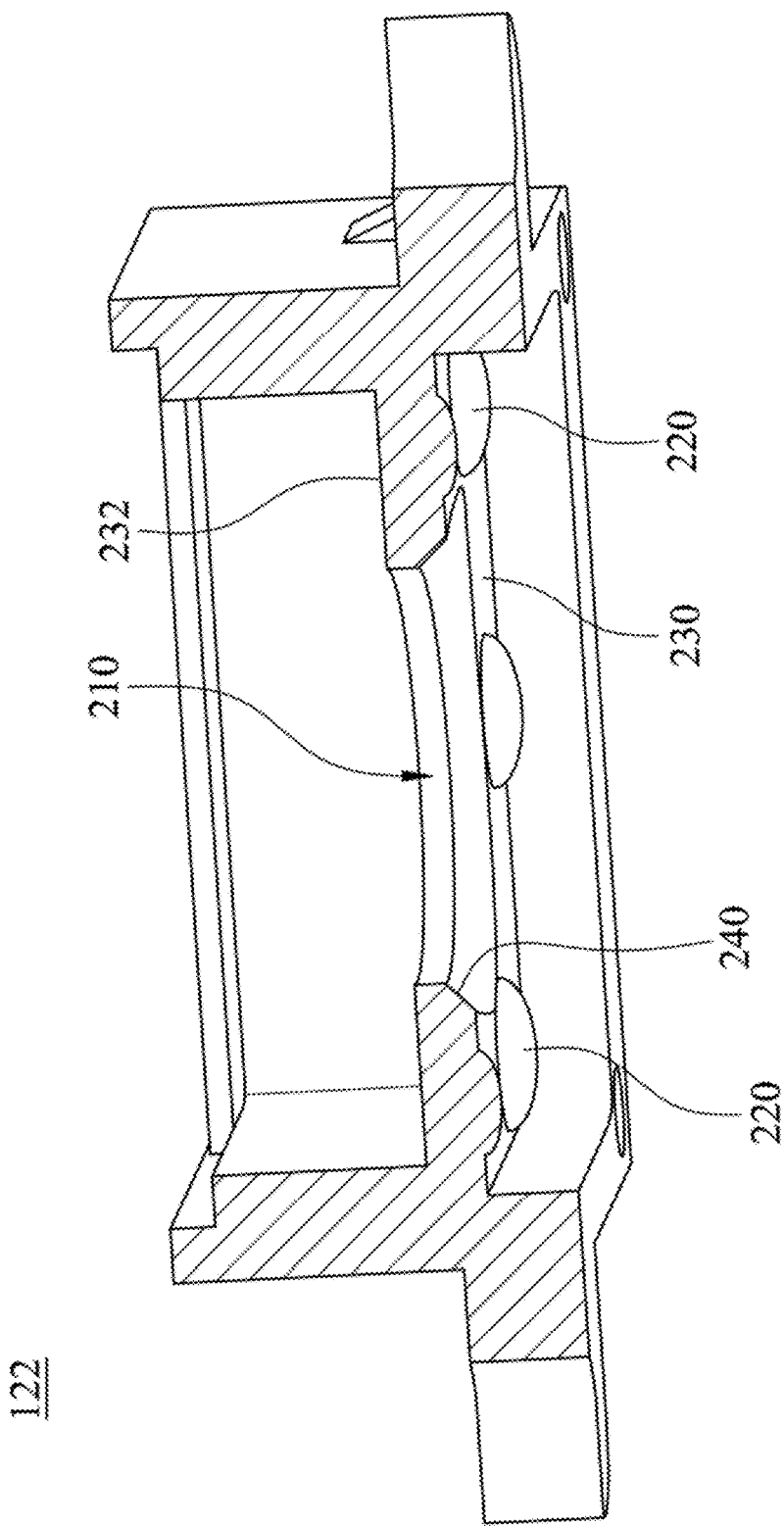
FIG. 2B illustrates a cross-sectional view of the light homogenizing member according to the embodiment of FIG. 1.
Figure 3B:
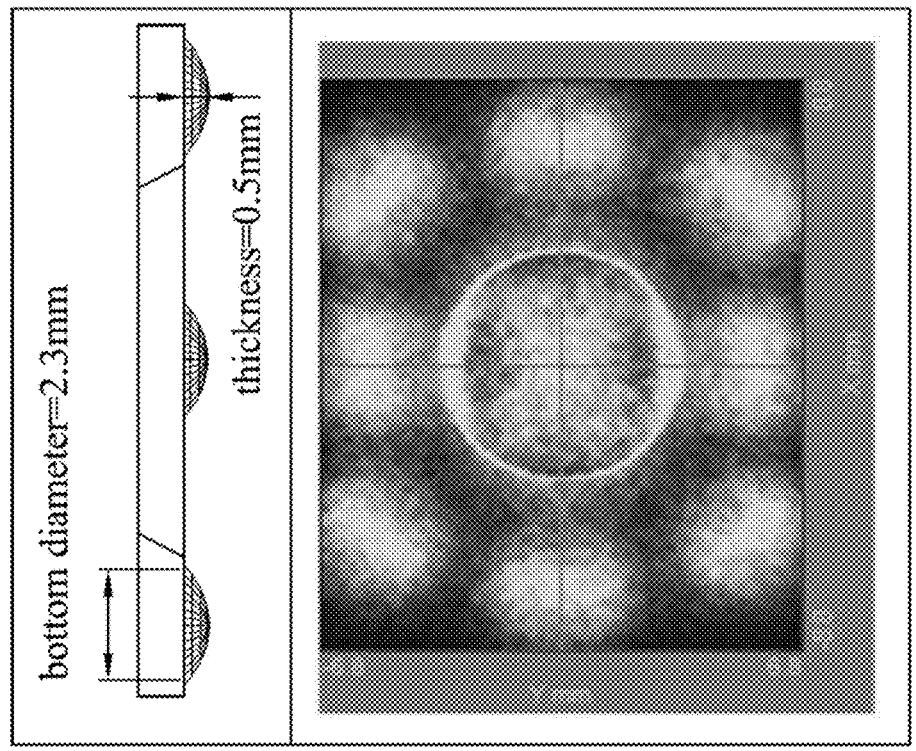
FIG. 3A, FIG. 3B, FIG. 3C, and FIG. 3D are schematic diagrams illustrating the light homogenizing performance of using various aspects of protrusion structures according to the embodiments of FIG. 1, FIG. 2A, and FIG. 2B.
Figure 3A:
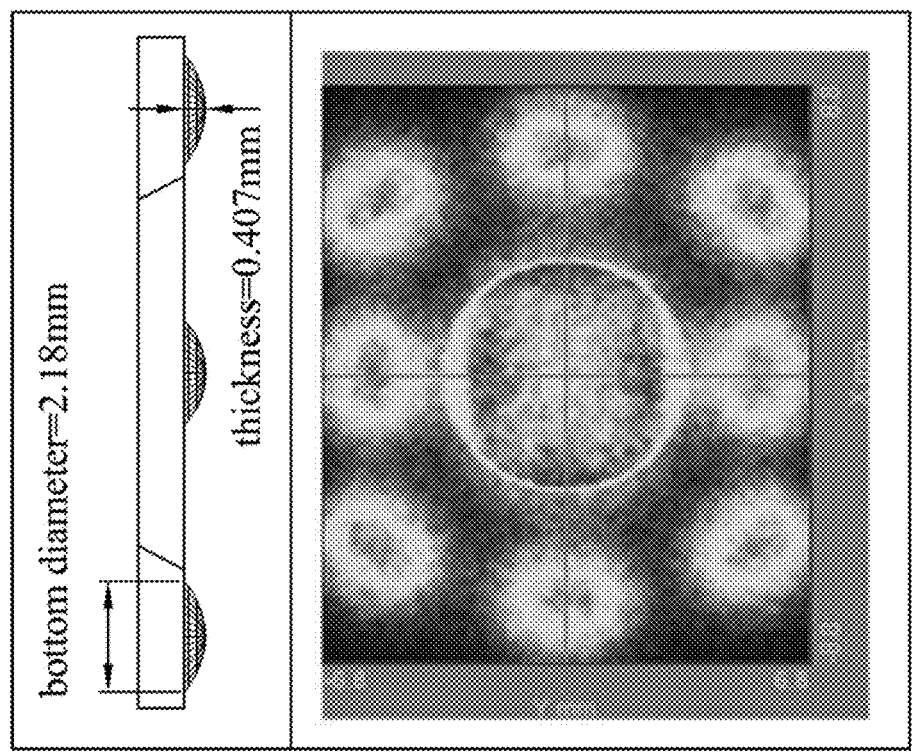
Figure 3D:
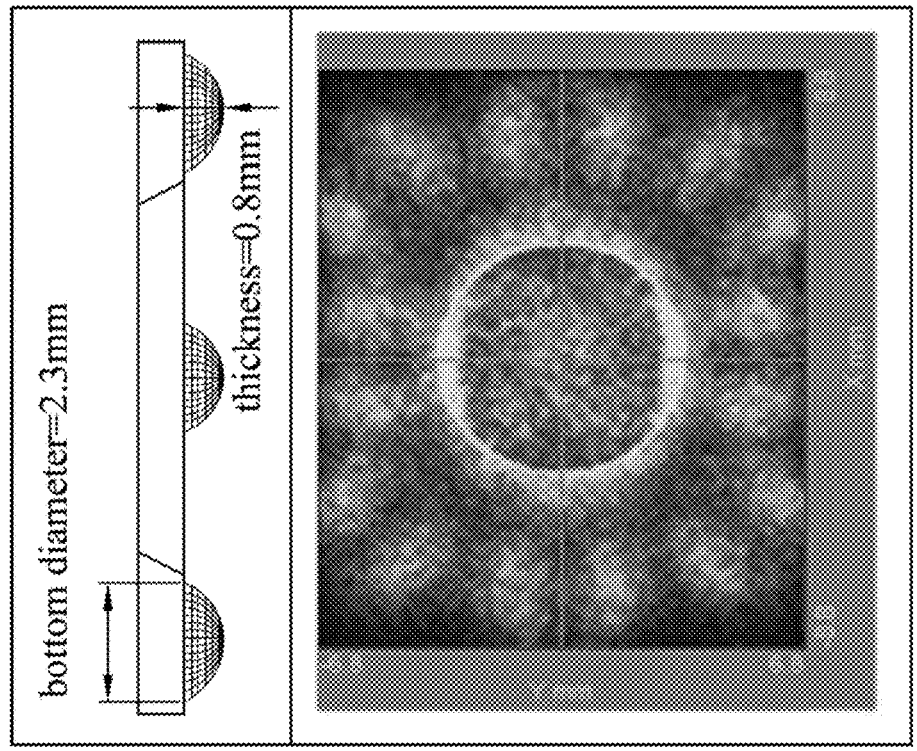
Figure 3C:
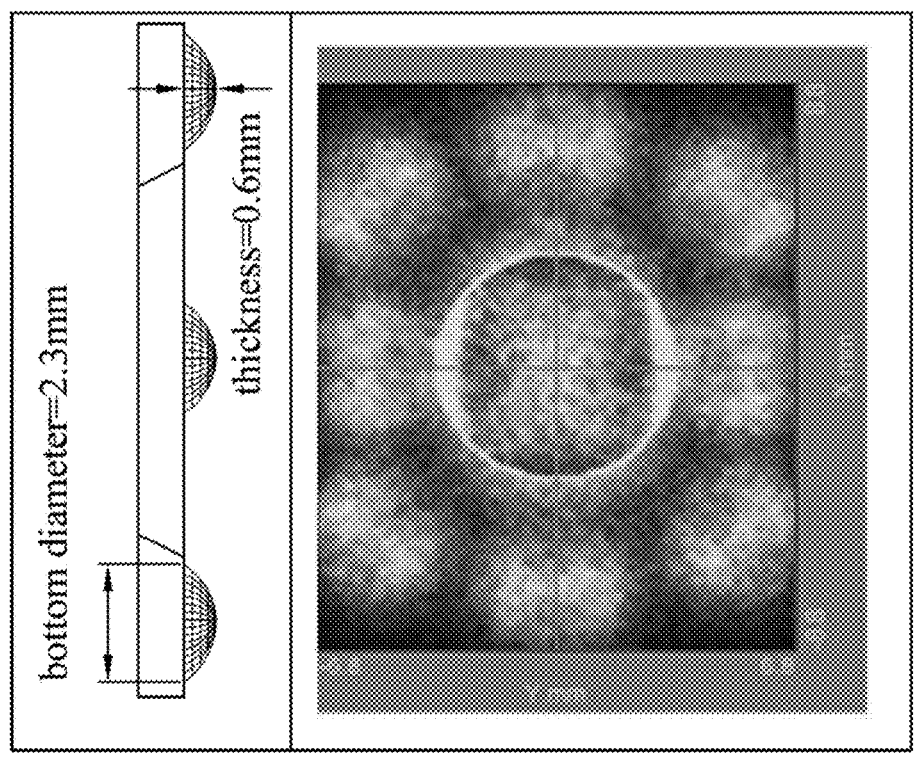

FIG. 1 illustrates a cross-sectional view of a biometric identifying device 100 according to an exemplary embodiment of the present disclosure. FIG. 2A illustrates a bottom view of a light homogenizing member 122 according to the embodiment of FIG. 1, and FIG. 2B illustrates a cross-sectional view of the light homogenizing member 122 according to the embodiment of FIG. 1. Please refer to FIG. 1, FIG. 2A, and FIG. 2B. The biometric identifying device 100 may include a press sheet 110, a light homogenizing device 120, and an imaging unit 130. The light homogenizing device 120 may include the light homogenizing member 122 and a plurality of light-emitting units 124.

The press sheet 110 can be pressed by or physically contacted with an organism 140 (e.g., a finger, a palm, etc.), such that the biometric identifying device 100 may correspondingly perform subsequent biometric identifications (e.g., a fingerprint identification). In one exemplary embodiment, the press sheet 110 may be a substrate with high mechanical intensity to prevent the elements under the press sheet 110 from being damaged by the press of the organism 140 or impacts of other external forces. Moreover, the press sheet 110 can be implemented by transparent materials (e.g., glasses or acrylic) to prevent from blocking a light L' emitted by the light-emitting unit 124 via the light homogenizing member 122.

As shown in FIG. 1, FIG. 2A, and FIG. 2B, the light homogenizing member 122 may include a hole 210 and a plurality of protrusion structures 220. To prevent from blocking a light L, the light homogenizing member 122 can be implemented by transparent materials as well. The protrusion structures 220 may be disposed on a first surface 230 of the light homogenizing member 122 and surround outside of the hole 210. In one embodiment, each of the protrusion structures 220 may have a curved convex surface. In another exemplary embodiment, a bottom diameter of the curved convex surface ranges between 2 mm and 2.5 mm, preferably. A thickness of the curved convex surface relative to the first surface 230 ranges between 0.4 mm and 0.9 mm, preferably. In a preferable embodiment, the bottom diameter of the curved convex surface and a maximum thickness of the protrusion structure are 2.3 mm and 0.8 mm, respectively. In addition, the protrusion structures 220 may be other convex surfaces having specific geometrical shapes chosen by the designers based on their demands, but the present disclosure is not limited thereto.

A circular inclined-plane 240 may be disposed between the hole 210 and the protrusion structures 220, and the circular inclined-plane 240 may be connected to the hole 210. The circular inclined-plane 240 may extend from the first surface 230 to a second surface 232, and a thickness of the light homogenizing member 122 may decrease along with an extension direction D1 of the circular inclined-plane 240. In one exemplary embodiment, the thickness of the light homogenizing member 122 exemplarily varies from 0.85 mm to 0.3 mm along with the circular inclined-plane 240. Further, a distance DD between each of the protrusion structures 220 and the circular inclined-plane 240 can be the same, but the present disclosure is not limited thereto.

The light-emitting units 124 may be disposed opposite to the first surface 230 and each of the light-emitting units 124 may emit the light L (e.g., visible light or invisible light) to one of the protrusion structures 220. Noted that the path of the light L in the figures are merely schematic, but the present disclosure is not limited thereto. Each of the light-emitting units 124 may be a light emitting diode (LED), a laser diode (LD), or an organic light emitting diode (OLEO), but the present disclosure is not limited thereto. In one embodiment, these positions of the light-emitting units 124 may be one-to-one corresponding to these positions of the protrusion structures 220. Taking FIG. 1 as an example, the light-emitting units 124 may be disposed under the protrusion structures 220, but the present disclosure is not limited thereto.

When the light L irradiates the protrusion structures 220, the protrusion structures 220 may diffuse the light L to homogenize the light L and outwardly transmit the light L' (e.g., the homogenized light L) through the second surface 232 of the light homogenizing member 122 to irradiate the organism 140 via the press sheet 110. Additionally, in the case of the light homogenizing member 122 having the circular inclined-plane 240, a part of the light L will directly pass through the hole 210 to light up sides and corners of the press sheet 110. That is, under the situation that the light homogenizing member 122 having the protrusion structures 220 and the circular inclined-plane 240, the light L' irradiating the organism 140 will be more uniform to facilitate the subsequent identifications.

The imaging unit 130 may identify the biometric (e.g., a fingerprint) of the organism 140 based on the light L" reflected by the organism 140. Similar to the light L, the paths of the light L' and L" are merely schematic as well, but the present disclosure is not limited thereto. In one embodiment, the imaging unit 130 may be an optical fingerprint reader or an optical-electrical hybrid fingerprint reader and include elements such as sensors and processors as well, which is not limited thereto. The position of the sensor may correspond to the hole 210, and the sensor may capture an image formed by the light L" reflected by the organism 140. Afterwards, the processor may identify the biometric of the organism 140 based on the image.

In other exemplary embodiments, the imaging unit 130 may be disposed with a microstructure layer 126 which may be used to converge the light L" to the imaging unit 130 to promote the identification rate of the imaging unit 130. Moreover, by disposing the microstructure layer 126 on the imaging unit 130, the length of the path of the light L" can be reduced, and hence the attenuation of the light L" can he reduced, but the present disclosure is not limited thereto.

In one embodiment, when the light L' irradiates crests and troughs in the fingerprint on the organism 140, the crests may reflect a part of the light L' as the light L", and the troughs may scatter or absorb a part of the light L'. Besides, the light L" may include a part of the light L' reflected by internal tissues of the organism 140 after the light L' penetrating the surface of the organism 140. At this moment, the imaging unit 130 may generate a gray-scale digital image (e.g., a fingerprint pattern with light and dark contrast) L", and the processor can perform fingerprint identification according to the gray-scale digital image. As mentioned before, since the light L' is better homogenized, the quality of the gray-scale digital image may be enhanced, and hence the accuracy of the fingerprint identification or other biometric identification can be correspondingly improved.

FIG. 3A, FIG. 3B, FIG. 3C, and FIG. 3D are schematic diagrams illustrating the light homogenizing performance of using various aspects of protrusion structures 220 according to the embodiments of FIG. 1, FIG. 2A, and FIG. 2B. In FIG. 3A to FIG. 3D, the protrusion structures 220 have, for example, curved convex surfaces, and the bottom diameter and the thickness of the curved convex surfaces are shown in FIG. 3A to FIG. 3D. As can be observed from FIG. 3A to FIG. 3D, the thicker (i.e., more convex) the thickness of the curved convex surface is, the more the, light L is diffused, and hence the light L' can be better homogenized.

To sum up, the light homogenizing device and the biometric identifying device having this light homogenizing device proposed in the present disclosure may homogenize the light from the light-emitting units via the protrusion structures and the circular inclined-plane disposed on the light homogenizing member, such that the light irradiating the organism to be identified can be more homogenized. In this situation, the quality of the image generated based on the light reflected by the organism can be correspondingly improved, and hence the accuracy of the biometric identification (e.g., fingerprint identification) can be promoted.

Although the present disclosure has been described in considerable detail with reference to certain embodiments thereof, other embodiments are possible. Therefore, the spirit and scope of the appended claims should not be sited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A light homogenizing device, comprising:
a light homogenizing member having a hole and a plurality of protrusion structures disposed on a first surface of the light homogenizing member and surrounding outside of the hole, wherein a circular inclined-plane is disposed between the hole and the protrusion structures, and the circular inclined-plane is connected to the hole; and a plurality of light-emitting units disposed opposite to the first surface, each of the light-emitting units emits a light to one of the protrusion structures, and the protrusion structures homogenizes the light and outwardly transmits the homogenized light through a second surface of the light homogenizing member.

2. The light homogenizing device of claim 1, wherein each of the protrusion structures has a curved convex surface.

3. The light homogenizing device of claim 1, wherein the protrusion structures comprises a first protrusion structure and a second protrusion structure, and a first distance between the circular inclined-plane and the first protrusion structure is equal to a second distance between the circular inclined-plane and the second protrusion structure.

4. The light homogenizing device of claim 1, wherein the circular inclined-plane extends from the first surface to the second surface, and a thickness of the light homogenizing member decreases along with an extension direction of the circular inclined-plane.

5. The light homogenizing device of claim 1, wherein a plurality of positions of the light-emitting units are one-to-one corresponding to a plurality of positions of the protrusion structures.

6. A biometric identifying device, comprising:
a press sheet configured to contact with an organism;
a light homogenizing device, comprising:
  a light homogenizing member having a hole and a plurality of protrusion structures disposed on a first surface of the light homogenizing member and surrounding outside of the hole, wherein a circular inclined-plane is disposed between the hole and the protrusion structures, and the circular inclined-plane is connected to the hole; and
a plurality of light-emitting units disposed opposite to the first surface, each of the light-emitting units emits a light to one of the protrusion structures, and the protrusion structures homogenizes the light and outwardly transmits the homogenized light through a second surface of the light homogenizing member to irradiate the organism through the press sheet; and
an imaging unit identifying a biometric of the organism based on the light reflected by the organism.

7. The biometric identifying device of claim 6, wherein each of the protrusion structures has a curved convex surface.

8. The biometric identifying device of claim 6, wherein the protrusion structures comprises a first protrusion structure and a second protrusion structure, and a first distance between the circular inclined-plane and the first protrusion structure is equal to a second distance between the circular inclined-plane and the second protrusion structure.

9. The biometric identifying device of claim 6, wherein the circular inclined-plane extends from the first surface to the second surface, and a thickness of the light homogenizing member decreases along with an extension direction of the circular inclined-plane.

10. The biometric identifying device of claim 6, wherein a plurality of positions of the light-emitting units are one-to-one corresponding to a plurality of positions of the protrusion structures.

11. The biometric identifying device of claim 6, wherein the imaging unit comprises a sensor capturing an image formed by the light reflected by the organism.

12. The biometric identifying device of claim 11, wherein the imaging unit further comprises a processor identifying the biometric of the organism based on the image.

13. The biometric identifying device of claim 6, wherein the organism is a finger, and the biometric is a fingerprint.

* * * * *